United States Patent

Agawa

(10) Patent No.: US 9,046,425 B2
(45) Date of Patent: Jun. 2, 2015

(54) OPTICAL FIBER TEMPERATURE DISTRIBUTION MEASUREMENT APPARATUS

(71) Applicant: YOKOGAWA ELECTRIC CORPORATION, Tokyo (JP)

(72) Inventor: Hisao Agawa, Tokyo (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 0 days.

(21) Appl. No.: 13/658,181

(22) Filed: Oct. 23, 2012

(65) Prior Publication Data
US 2013/0100984 A1    Apr. 25, 2013

(30) Foreign Application Priority Data

Oct. 24, 2011    (JP) ................................. 2011-232838

(51) Int. Cl.
*G01K 11/00* (2006.01)
*G01K 11/32* (2006.01)
*G01K 15/00* (2006.01)

(52) U.S. Cl.
CPC .............. *G01K 11/32* (2013.01); *G01K 15/005* (2013.01); *G01K 2011/324* (2013.01)

(58) Field of Classification Search
CPC   G01K 15/005; G01K 2011/324; G01K 11/32
USPC ........ 385/12; 374/1, 120, 121, 130–132, 161, 374/127, 124, 137, 29, 30, 110; 356/43
See application file for complete search history.

(56) References Cited

U.S. PATENT DOCUMENTS

| 4,823,166 | A  | * | 4/1989 | Hartog et al. ................. 356/44 |
| 5,054,935 | A  |   | 10/1991 | Tanabe et al. |
| 5,102,232 | A  |   | 4/1992 | Tanabe et al. |
| 2006/0115204 | A1 | * | 6/2006 | Marsh et al. ................... 385/12 |
| 2006/0239330 | A1 | * | 10/2006 | Yamate et al. ............... 374/161 |
| 2008/0273852 | A1 |   | 11/2008 | Parker et al. |

FOREIGN PATENT DOCUMENTS

| EP | 0213872 A2 | 3/1987 |
| GB | 2234346 A | 1/1991 |

(Continued)

OTHER PUBLICATIONS

Extended European Search Report issued Feb. 25, 2014, corresponds to European patent application No. 12188777.2.

*Primary Examiner* — Lisa Caputo
*Assistant Examiner* — Janice M Soto
(74) *Attorney, Agent, or Firm* — Lowe Hauptman & Ham, LLP

(57) ABSTRACT

The present apparatus includes: an intensity ratio calculation unit configured to calculate a first and a second intensity ratios which are ratios of Stokes light intensity to anti-Stokes light intensity obtained when a light pulse is output to a first end and a second end of an optical fiber, respectively; a temperature calculation unit configured to calculate a temperature distribution along the optical fiber based on a reference temperature, the first and the second intensity ratios, and a total length loss ratio, which is a loss ratio of Stokes light to anti-Stokes light with regard to a total length of the optical fiber; and a total length loss ratio calculation unit configured to calculate the total length loss ratio based on the first and the second intensity ratios with regard to a location in a predetermined section close to both ends of the optical fiber whose temperature is kept constant.

5 Claims, 7 Drawing Sheets

(56) References Cited

FOREIGN PATENT DOCUMENTS

| | | |
|---|---|---|
| GB | 2441552 A | 3/2008 |
| JP | 62110160 A | 5/1987 |
| JP | 2-201233 A | 8/1990 |
| JP | 2602981 B2 | 2/1992 |
| JP | 04318432 A | 11/1992 |
| JP | 2008-249515 A | 10/2008 |
| JP | 2008249515 * | 10/2008 |
| WO | 2004104536 A1 | 12/2004 |
| WO | 2007066146 A2 | 6/2007 |

* cited by examiner

—PRIOR ART—

OPTICAL FIBER TEMPERATURE DISTRIBUTION MEASUREMENT APPARATUS

CROSS-REFERENCE TO RELATED APPLICATION

This application is based on Japanese Patent Application No. 2011-232838 filed with the Japan Patent Office on Oct. 24, 2011, the entire content of which is hereby incorporated by reference.

BACKGROUND

1. Technical Field

The present disclosure relates to an apparatus for measuring temperature distribution along an optical fiber by using Raman scattered light.

2. Related Art

A DTS (Distributed Temperature Sensor) has been used for measuring temperature distribution along an optical fiber. The DTS is an apparatus for measuring temperature distribution along an optical fiber by using backscattered light generated in the optical fiber. The backscattered light includes Rayleigh scattered light, Brillouin scattered light and Raman scattered light, for example. The Raman scattered light, which has strong temperature dependence, is used for temperature measurement. In the case of the temperature measurement by using the Raman scattered light, anti-Stokes light (AS light) having a shorter wavelength than incident light and Stokes light (ST light) having a longer wavelength than the incident light are used.

The DTS measures the intensity Ias of the AS light and the intensity Ist of the ST light to calculate the temperature based on the intensity ratio. Thus, the temperature distribution along the optical fiber is measured. The DTS is used in fields such as temperature management of a plant installation, disaster prevention, temperature management of an electric cable, and air conditioning of a server room or a building.

The principle of the DTS is shown in FIG. 4. In measurement of the temperature distribution by the DTS, a temperature distribution measurement unit 100 outputs a light pulse to an optical fiber 101 (optical fiber for sensor). As shown in FIG. 5, the temperature distribution measurement unit 100 includes a pulse generation unit 102, a light source 103, a directional coupler 104, an optical filter 105, a first optical-electrical converter 106, a second optical-electrical converter 107, a first amplifier 108, a second amplifier 109, a first AD converter 110, a second AD converter 111, an averaging circuit 112, a calculation unit 113, a temperature correction unit 114, and a reference temperature unit 115.

The pulse generation unit 102 causes the light source 103 to generate pulse light with timing in synchronization with the averaging circuit 112. The generated pulse light is input to the optical fiber 101 through the directional coupler 104. As shown in FIG. 4, Raman scattered light is generated almost everywhere in the optical fiber 101. The generated Raman scattered light is input to the temperature distribution measurement unit 100. The Raman scattered light input to the temperature distribution measurement unit 100 is guided by the directional coupler 104 to the optical filter 105.

The Raman scattered light is split by the optical filter 105 into anti-Stokes light (AS light) and Stokes light (ST light). The ST light is opto-electrically converted by the first optical-electrical converter 106, amplified by the first amplifier 108, and converted by the first AD converter 110 into a digital signal. The AS light is opto-electrically converted by the second optical-electrical converter 107, amplified by the second amplifier 109, and converted by the second AD converter 111 into a digital signal.

The averaging circuit 112 performs averaging processing for noise reduction. The calculation unit 113 calculates the ratio of the AS light intensity Ias to the ST light intensity Ist (Raman intensity ratio). The Raman intensity ratio is proportional to the temperature of the optical fiber 101. Therefore, the temperature distribution along the optical fiber 101 can be measured based on the Raman intensity ratio.

As shown in FIG. 5, the reference temperature unit 115 is provided between the directional coupler 104 and the optical fiber 101. An optical fiber is coiled in the reference temperature unit 115. The reference temperature unit 115 is provided with a highly-accurate thermometer 115s typified by a platinum resistance temperature sensor. The thermometer 115s measures the reference temperature and outputs a measurement result to the calculation unit 113. The calculation unit 113 calculates the temperature distribution along the optical fiber based on the reference temperature and the Raman intensity ratio.

A signal on a time domain of the Raman intensity ratio can be obtained by inputting the light pulse to the optical fiber 101 as shown in FIG. 4. The time corresponds to a location along the optical fiber. The calculation unit 113 obtains the Raman intensity ratio of the whole length along the optical fiber 101. The calculation unit 113 performs predetermined calculations by using the Raman intensity ratio and the reference temperature. As a result, the temperature distribution of the whole length of the optical fiber 101 can be obtained. The temperature correction unit 114 performs predetermined correction processing with respect to the temperature distribution along the optical fiber 101 obtained by the calculation unit 113.

As shown in FIG. 4, in a spectrum of the Raman scattered light, the anti-Stokes light (AS light) appears on the shorter-wavelength side (wavelength: $\lambda 0-\lambda X$) of the Rayleigh light (wavelength: $\lambda 0$). In addition, he Stokes light (ST light) appears on the longer-wavelength side (wavelength: $\lambda 0+\Delta \lambda'$) of the Rayleigh light.

In this manner, the temperature distribution measurement unit 100 uses the Raman scattered light to obtain the temperature with respect to each location along the optical fiber 101 corresponding to the time domain. As a result, the temperature distribution of the whole length of the optical fiber 101 is measured. If there is a hot section HT as shown in FIG. 4, the temperature of the optical fiber 101 is high in the vicinity of the hot section HT. Therefore, temperature distribution where the temperature of a part of the optical fiber 101 is increased is obtained as shown in FIG. 4.

In the case of the configuration shown in FIGS. 4 and 5, only one end of the optical fiber 101 is connected to the temperature distribution measurement unit 100. That is, the above-mentioned measurement is single-ended temperature distribution measurement with respect to the optical fiber 101. Here, loss of the AS light intensity Ias and the ST light intensity Ist is caused within the optical fiber 101 while the Raman scattered light propagates from a location of generation to the near end of the optical fiber. Therefore, in the single-ended measurement, the Raman intensity ratio is corrected by using the loss ratio of Ias to Ist (Raman loss ratio (loss profile)) of the optical fiber.

For this reason, the loss profile is recognized in advance in the single-ended measurement. However, if the optical fiber 101 includes a plurality of different kinds of optical fibers having different Raman loss ratios each of which is connected to each other, the Raman loss ratio is different depending on a location along the optical fiber 101. In this case, an accurate loss profile is hard to recognize.

FIG. 6 is a diagram illustrating an apparatus for performing double-ended measurement along the optical fiber temperature. In the double-ended measurement, either one of the near end and the far end of the optical fiber 101 is selected, and the selected one is connected to an optical switch 120 that is connected to the temperature distribution measurement unit 100.

The optical switch 120 has a channel A (CH-A) and a channel B (CH-B). The channel A is connected to one end of the optical fiber 101, and the channel B is connected to the other end of the optical fiber 101. In the double-ended measurement, both of measurement by using the channel A and measurement by using the channel B are performed in order to obtain Ias and Ist. Thereafter, measurement results are synthesized (obtain geometric mean). As shown in FIG. 7, a distance from the channel A to a location X in the optical fiber 101 is defined as X. The Raman intensity ratio that is measured with respect to the location X is defined as G(X). In this case, in the double-ended measurement, G(X) can be expressed by the following Equation 1.

⟨Equation 1⟩

$$G(X) = \sqrt{\frac{IasA(X) \times L(X)}{IstA(X)}} \times \sqrt{\frac{IasB(m-X) \times L(m-X)}{IstB(m-X)}} \quad \text{(Equation 1)}$$

Here, IasA(X) is Ias at the location X responding to the light pulse from the channel A;

IstA(X) is Ist at the location X responding to the light pulse from the channel A;

IasB(m−X) is Ias at the location X responding to the light pulse from the channel B;

IstB(m−X) is Ist at the location X responding to the light pulse from the channel B;

m is the total length of the optical fiber 101;

L(X) is the Raman loss ratio from the channel A to the location X; and

L(m−X) is the Raman loss ratio from the channel B to the location X.

Note that IasA(X)/IstA(X) and IasB(m−X)/IstB(m−X) in Equation 1 are equal to each other because they both are the pre-loss Raman intensity ratio in the optical fiber with regard to the same location. The above-mentioned same value is defined as G0(X). In this case, the following Equation 2 can be obtained.

<Equation 2>

$$G(X) = G0(X) \times \sqrt{L(X) \times L(m-X)} \quad \text{(Equation 2)}$$

As mentioned above, L(X) is the Raman loss ratio from the channel A (one end of the optical fiber 101) to the location X, and L(m−X) is the Raman loss ratio from the location X to the channel B (other end of the optical fiber 101). The result of multiplication of L(X) and L(m−X) corresponds to the Raman loss ratio from the one end to the other end of the optical fiber 101 (i.e. the Raman loss ratio with regard to the total length of the optical fiber 101). Accordingly, the term "L(X)×L(m−X)" in Equation 2 takes a constant value independent of the location X. When "L(X)×L(m−X)" is denoted by "Ltotal", the above-mentioned Equation 2 can be written as the following Equation 3.

<Equation 3>

$$G(X) = G0(X) \times \sqrt{Ltotal} \quad \text{(Equation 3)}$$

As mentioned above, the parameter Ltotal is the Raman loss ratio with regard to the total length of the optical fiber 101 and independent of the location X in the optical fiber 101. Therefore, there is no need to recognize the above-mentioned loss profile in the double-ended measurement. The temperature distribution along the optical fiber is accurately measured as long as the parameter Ltotal being a fixed value is recognized.

Such a technique that measures the temperature distribution along the optical fiber based on the intensity ratio of the Stokes light intensity Ist to the anti-Stokes light intensity Ias is disclosed in, e.g., JP-A-2008-249515.

SUMMARY

An optical fiber temperature distribution measurement apparatus includes: a pulse output unit configured to output a light pulse to a selected one of a first end and a second end of an optical fiber; an intensity ratio calculation unit configured to calculate a first intensity ratio and a second intensity ratio, wherein the first intensity ratio is a ratio of Stokes light intensity to anti-Stokes light intensity obtained when the light pulse is output to the first end of the optical fiber, and the second intensity ratio is a ratio of Stokes light intensity to anti-Stokes light intensity obtained when the light pulse is output to the second end of the optical fiber, a reference temperature unit including a reference temperature optical fiber and a first reference thermometer configured to measure a temperature with a temperature of the reference temperature optical fiber being a reference temperature; a temperature calculation unit configured to calculate a temperature distribution along the optical fiber based on the reference temperature, the first intensity ratio, the second intensity ratio, and a total length loss ratio, wherein the total length loss ratio is a loss ratio of Stokes light intensity to anti-Stokes light intensity with regard to a total length of the optical fiber; a constant-temperature unit configured to keep a temperature of a predetermined section close to both ends of the optical fiber constant; and a total length loss ratio calculation unit configured to calculate the total length loss ratio based on the first intensity ratio and the second intensity ratio with regard to a location in the predetermined section.

DETAILED DESCRIPTION

Figure 1:
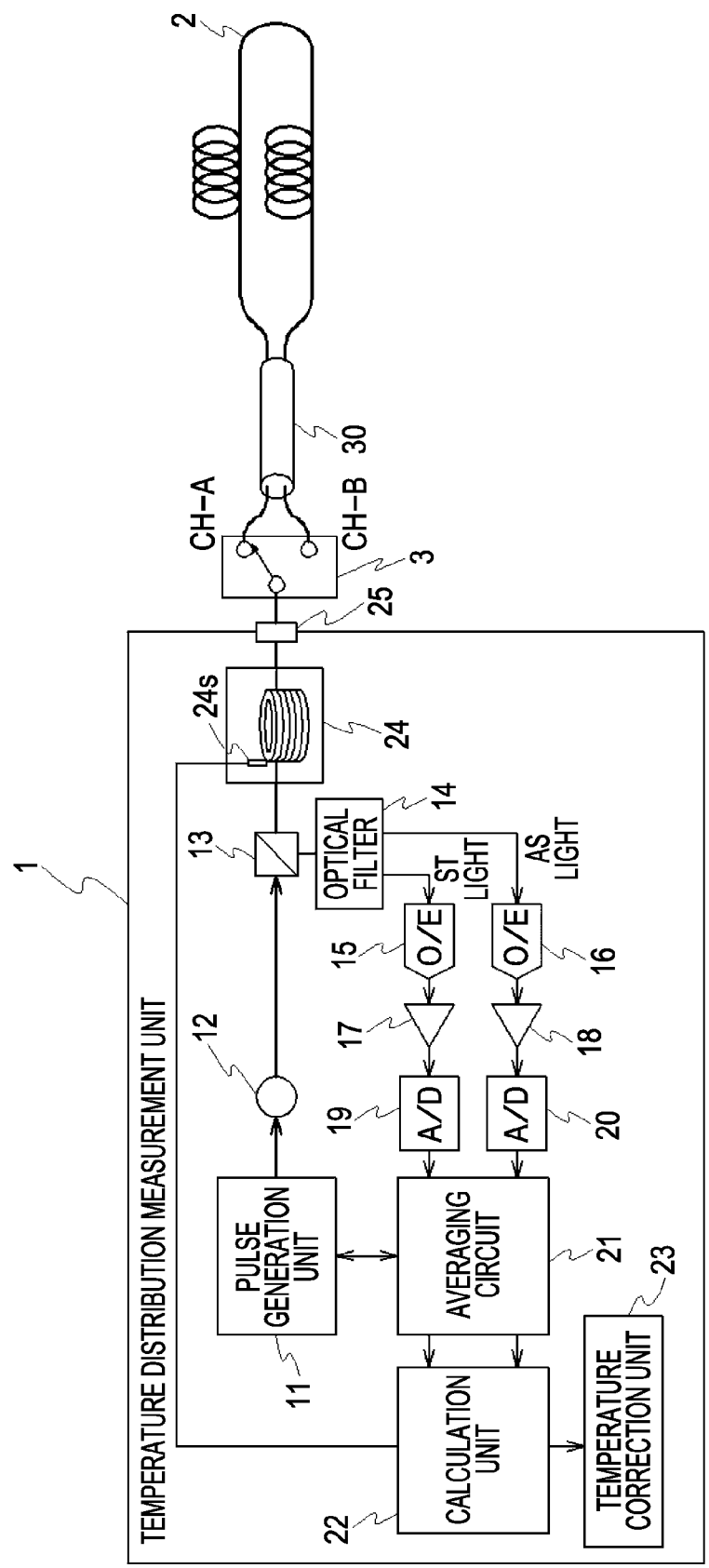
FIG. 1 is a configuration diagram illustrating an optical fiber temperature distribution measurement apparatus according to the present embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A phenomenon called "darkening" may be caused with respect to an optical fiber. If the darkening is caused, the Raman loss ratio in the optical fiber is changed. Accordingly, the above-described parameter Ltotal in Equation 3, namely, the Raman loss ratio with regard to the total length of the optical fiber 101 is changed. As a result, it becomes difficult to accurately measure the temperature distribution of the optical fiber 101 by the double-ended measurement.

An object of the present disclosure is to accurately measure temperature distribution along an optical fiber by the double-ended measurement even if the parameter Ltotal of the optical fiber varies.

Embodiments of the present disclosure will be described below with reference to the accompanying drawings. An optical fiber temperature distribution measurement apparatus (present apparatus) according to an embodiment performs double-ended measurement of temperature distribution along an optical fiber 2.

The present apparatus includes a temperature distribution measurement unit 1 and an optical switch 3. The near end and the far end of the optical fiber (optical fiber for sensor) 2 are connected to the optical switch 3. That is, the optical fiber 2 forms the double-ended configuration. The optical switch (pulse output unit) 3 has a channel A (CH-A) and a channel B (CH-B). The channel A is connected to the near end of the optical fiber 2. The channel B is connected to the far end of the optical fiber 2. The optical switch 3 connects the optical fiber 2 and the temperature distribution measurement unit 1 through either the channel A or the channel B. That is, the optical switch 3 connects a selected one of the near end (channel A) and the far end (channel B) of the optical fiber 2 to the temperature distribution measurement unit 1.

The temperature distribution measurement unit 1 includes a pulse generation unit 11, a light source 12, a directional coupler 13, an optical filter 14, a first optical-electrical converter 15, a second optical-electrical converter 16, a first amplifier 17, a second amplifier 18, a first ADC 19, a second ADC 20, an averaging circuit 21, a calculation unit 22, a temperature correction unit 23, a reference temperature unit 24, and an optical connector 25. Note that, in the drawing, the optical-electrical converter is denoted by "O/E" and the ADC (Analog-Digital Converter) is denoted by "A/D".

The pulse generation unit (pulse output unit) 11 causes the light source 12 to output a light pulse with timing in synchronization with the averaging circuit 21. The light pulse is input to the optical switch 3 through the directional coupler 13 and the optical connector 25. In the example shown in FIG. 1, the optical switch 3 connects the channel A to the temperature distribution measurement unit 1. In this case, the light pulse is output from the channel A and input to the optical fiber 2. Of course, the optical switch 3 can switch the channel connected with the temperature distribution measurement unit 1 to the channel B instead.

Due to the pulse light input to the optical fiber 2, Raman scattered light is generated almost everywhere along the optical fiber 2. The Raman scattered light is input to the temperature distribution measurement unit 1. The Raman scattered light input to the temperature distribution measurement unit 1 is guided by the directional coupler (optical branching device) 13 to the optical filter 14. The Raman scattered light is split by the optical filter 14 into anti-Stokes light (AS light) and Stokes light (ST light).

The ST light is opto-electrically converted by the first optical-electrical converter 15 to be an electrical signal. The electrical signal is amplified by the first amplifier 17. Then, the electrical signal is converted by the first ADC 19 from an analog signal to a digital signal. The digital signal corresponds to the intensity Ist of the ST light. The digital signal is input to the averaging circuit 21.

The AS light is opto-electrically converted by the second optical-electrical converter 16 to be an electrical signal. The electrical signal is amplified by the second amplifier 18. Then, the electrical signal is converted by the second ADC 20 from an analog signal to a digital signal. The digital signal corresponds to the intensity Ias of the AS light. The digital signal is input to the averaging circuit 21.

The averaging circuit 21 performs averaging processing for noise reduction with respect to the digital signal corresponding to the intensity Ist and the digital signal corresponding to the intensity Ias. A synchronization signal is transferred between the averaging circuit 21 and the pulse generation unit 11. The averaging circuit 21 and the pulse generation unit 11 are in synchronization with each other.

The calculation unit (intensity ratio calculation unit, temperature calculation unit, total length loss ratio calculation unit) 22 calculates the ratio of the Stokes light intensity Ist to the anti-Stokes light intensity Ias (Raman intensity ratio). Moreover, the calculation unit 22 obtains temperature distribution along the optical fiber 2 based on the calculation result and the reference temperature obtained by the reference temperature unit 24. The temperature correction unit 23 corrects the temperature obtained by the calculation unit 22 by using a parameter such as Raman shift frequency.

The reference temperature unit 24 is provided between the directional coupler 13 and the optical connector 25. A reference temperature optical fiber is coiled in the reference temperature unit 24. The reference temperature unit 24 is provided with a highly-accurate temperature sensor (first reference thermometer) 24s typified by a platinum resistance temperature sensor. The temperature sensor 24s measures the temperature of the reference temperature optical fiber (reference temperature) and outputs a measurement result to the calculation unit 22 and the temperature correction unit 23.

As shown in FIG. 1, the near end of the loop part of the optical fiber 2 is connected to the channel A of the optical switch 3. The far end of the loop part of the optical fiber 2 is connected to the channel B of the optical switch 3. Two predetermined sections of the optical fiber 2 within a certain distance range from the two channels A and B are included in a constant-temperature unit 30. The constant-temperature unit 30 keeps the temperature of the two predetermined sections of the optical fiber 2 constant. Therefore, the two predetermined sections are constant-temperature sections.

Next, an operation of the present apparatus will be described. The intensity of the Stokes light and the anti-Stokes light generated in the optical fiber 2 is lost (attenuation) in optical fiber 2 on the way back to the temperature distribution measurement unit 1, as described above. As a result of the loss, the Raman intensity ratio (ratio of the Stokes light intensity Ist to the anti-Stokes light intensity Ias) at a location (location of scattering) where the Stokes light and the anti-Stokes light are generated in the optical fiber 2 differs from the Raman intensity ratio measured by the temperature distribution measurement unit 1. The Raman intensity ratio at the location of scattering in the optical fiber 2 is hereinafter referred to as "pre-loss Raman intensity ratio".

According to the measurement of the temperature distribution along the optical fiber 2 by the present apparatus, a light pulse is first output from the channel A and the Raman intensity ratio (first intensity ratio) is measured. After that, a light pulse is output from the channel B and the Raman intensity ratio (second intensity ratio) is measured.

Figure 2:
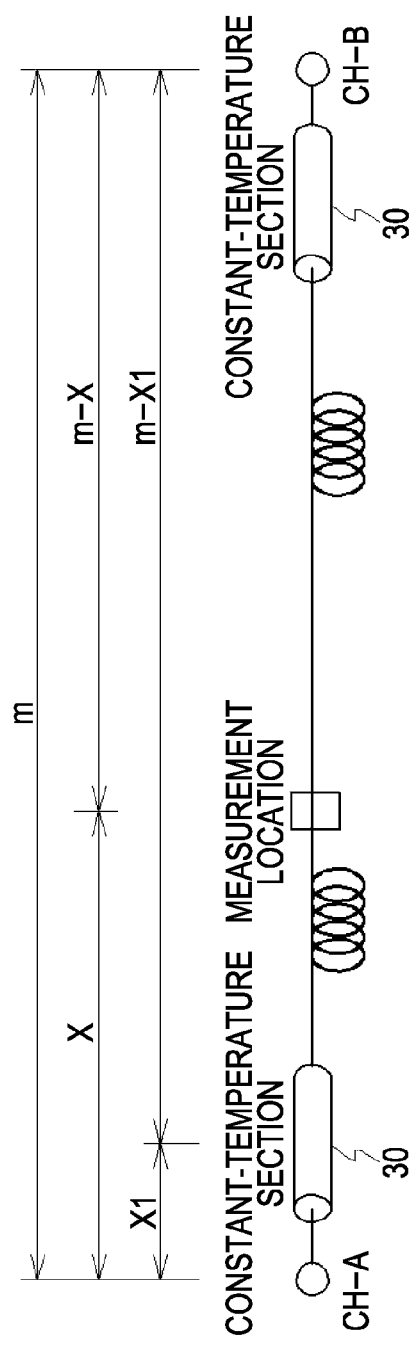
FIG. 2 is a diagram for describing double-ended measurement according to the present embodiment.

FIG. 2 is a development diagram illustrating the optical fiber 2. A location X1 is located within the constant-temperature unit 30. The distance from the channel A to the location X1 is X1. The Raman intensity ratio G(X1) that is the intensity ratio of Ias to Ist with regard to the location X1 and measured by using the channel A is expressed by the following Equation 4.

$$G(X1)=G0(X1) \times L(X1) \quad \text{(Equation 4)}$$

Here, G0(X1) is the pre-loss Raman intensity ratio at the location X1 at the temperature T, and L(X1) is the ratio of loss of Ias to Ist (Raman loss ratio) regarding the distance X1 from the channel A to the location X1.

Meanwhile, the total length of the optical fiber 2 (i.e. length from the channel A to the channel B) is expressed by "m". In this case, the distance from the channel B to the location X1 is expressed by "m−X1". Therefore, the Raman intensity ratio G(m−X1) with regard to the location X1 measured by using the channel B is expressed by the following Equation 5.

$$G(m-X1)=G0(X1) \times L(m-X1) \quad \text{(Equation 5)}$$

Dividing Equation 5 by Equation 4 yields the following Equation 6.

⟨Equation 6⟩

$$\frac{G(m-X1)}{G(X1)} = \frac{L(m-X1)}{L(X1)} \quad \text{(Equation 6)}$$

The total length m of the optical fiber 2 is several kilometers. On the other hand, the location X1 is very close to the temperature distribution measurement unit 1 within the constant-temperature unit 30. The distance X1 from the channel A to the location X1 is only several meters to several tens of meters. The distance X1 is very short as compared with the total length m of the optical fiber 2. Therefore, the Raman loss ratio with regard to the location X1 is negligibly small, and we can assume "L(X1)≈1".

Moreover, since the distance X1 from the channel A to the location X1 is very short as compared with the total length m of the optical fiber 2, we can assume that L(m−X1) is almost equal to L(m). The parameter L(m) is the Raman loss ratio with regard to the total length of the optical fiber 2, namely L(m)=Ltotal. Therefore, the following Equation 7 can be obtained.

⟨Equation 7⟩

$$Ltotal = L(m) \approx \frac{L(m-X1)}{L(X1)} = \frac{G(m-X1)}{G(X1)} \quad \text{(Equation 7)}$$

Therefore, Ltotal can be obtained if G(X1) and G(m−X1) are obtained. As described above, G(X1) is the Raman intensity ratio regarding the location X1 that is measured by using the channel A (i.e. first intensity ratio with regard to the location X1). On the other hand, G(m−X1) is the Raman intensity ratio regarding the location X1 that is measured by using the channel B (i.e. second intensity ratio with regard to the location X1). Therefore, the calculation unit 22 can measure the Raman intensity ratios G(X1) and G(m−X1) by using the pulse light input to the optical fiber 2.

Accordingly, the calculation unit 22 can obtains Ltotal based on the Raman intensity ratios G(X1) and G(m−X1). Consequently, even if Ltotal of the optical fiber 2 varies due to darkening and the like, the Ltotal after variation can be easily obtained according to the present apparatus.

The calculation unit 22 uses Ltotal to obtain G0(X) in the above-described Equation 3. The parameter G0(X) is the Raman intensity ratio at the location X and the Raman intensity ratio depends on the temperature. Therefore, the calculation unit 22 can obtain the temperature at the location X of the optical fiber 2 by using the reference temperature obtained by the reference temperature unit 24. Accordingly, the calculation unit 22 can obtain the temperature distribution of the whole length of the optical fiber 2.

The above-mentioned G(X1) and G(m−X1) are the Raman intensity ratios with regard to the location X1 within the constant-temperature unit 30. The section where the temperature is kept constant included in the constant-temperature unit 30 (constant-temperature section) of the optical fiber 2 has a certain length. The parameter Ltotal may be measured for plural times by changing the location X1 a little bit (e.g. several meters) at a time within the constant-temperature section, and an average value of the plurality of Ltotal with regard to a plurality of locations may be calculated as Ltotal. In this case, accuracy of Ltotal can be increased. As a result, accuracy of the measurement of the temperature distribution can be further improved.

Figure 3:
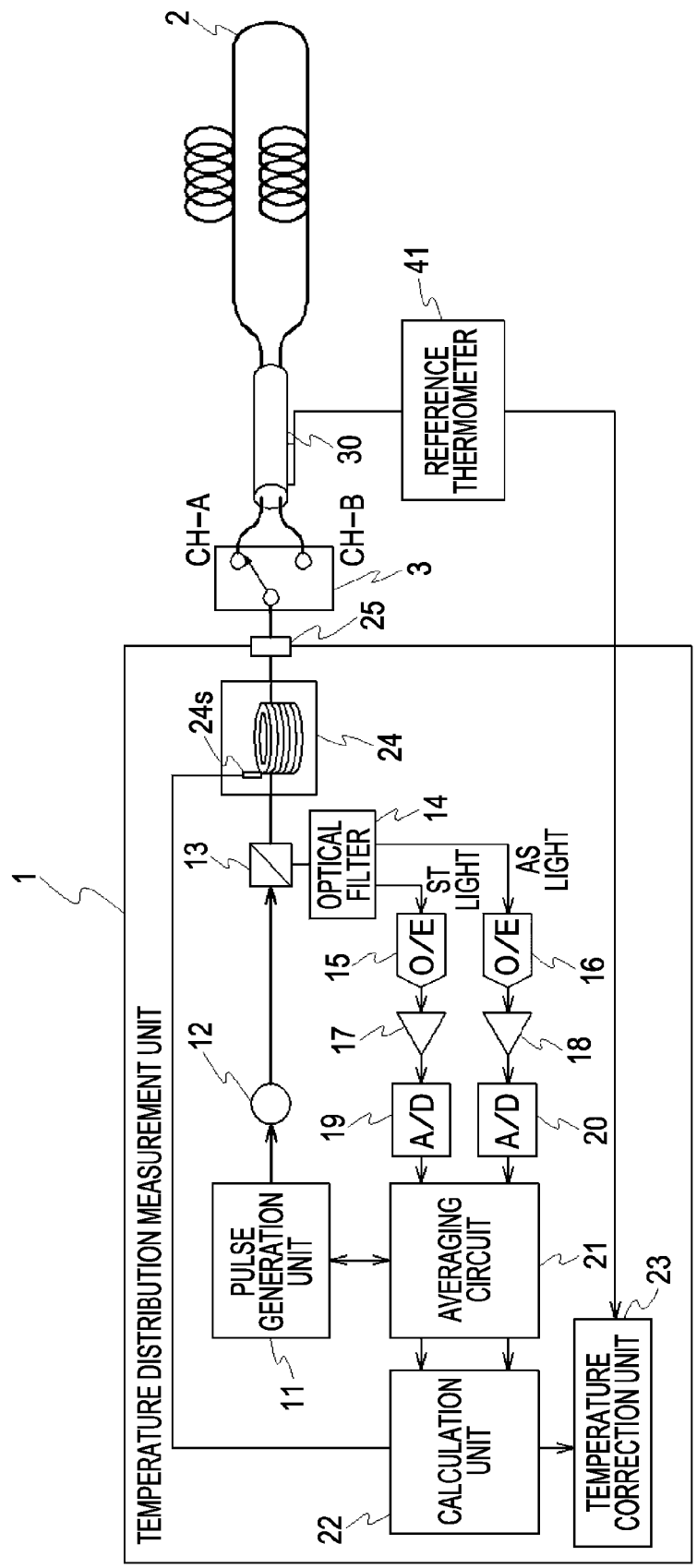
FIG. 3 is a configuration diagram illustrating an optical fiber temperature distribution measurement apparatus provided with a reference thermometer.
Figure 4:
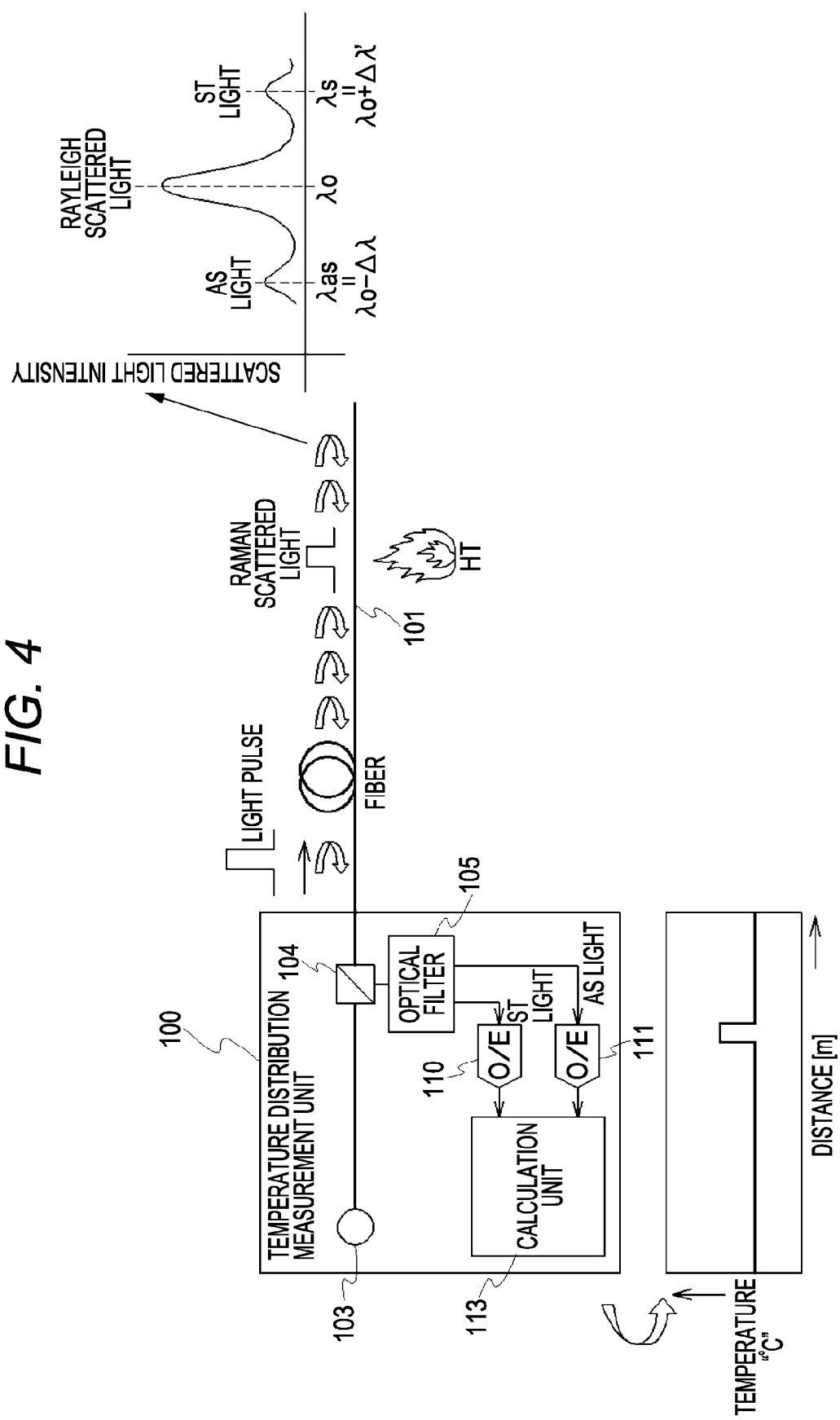
FIG. 4 is a diagram illustrating an optical fiber temperature distribution measurement apparatus used for single-ended measurement.
Figure 5:
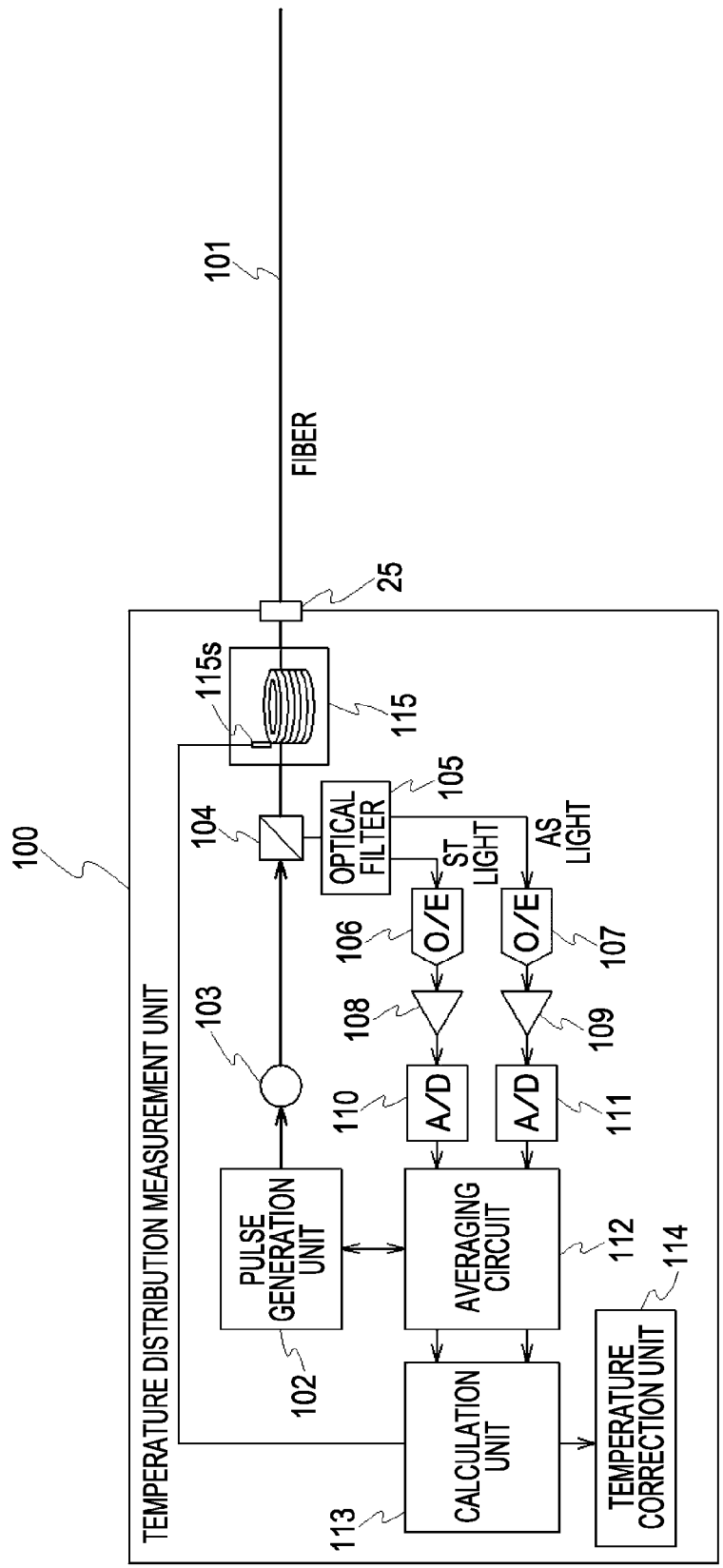
FIG. 5 is a diagram illustrating a configuration of a temperature distribution measurement unit.
Figure 6:
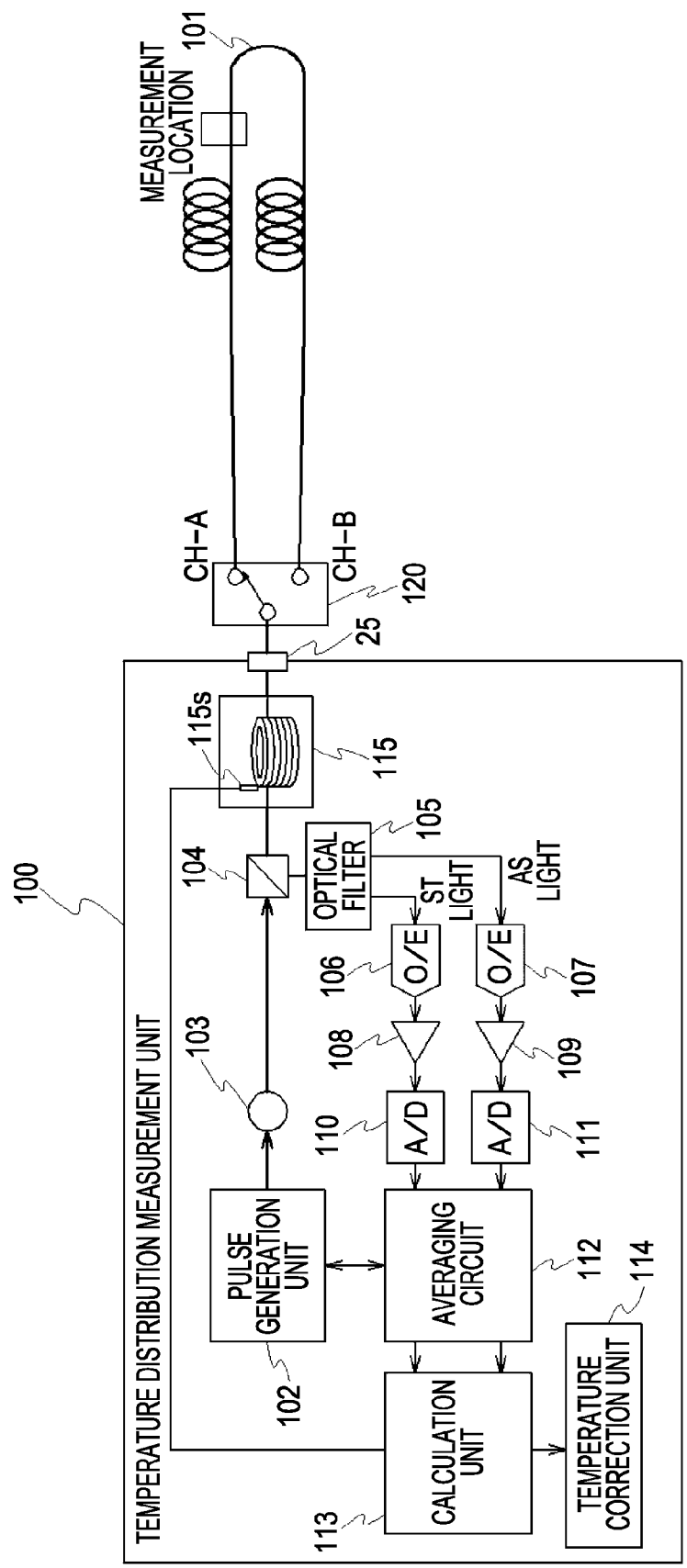
FIG. 6 is a diagram illustrating an optical fiber temperature distribution measurement apparatus used for double-ended measurement.
Figure 7:
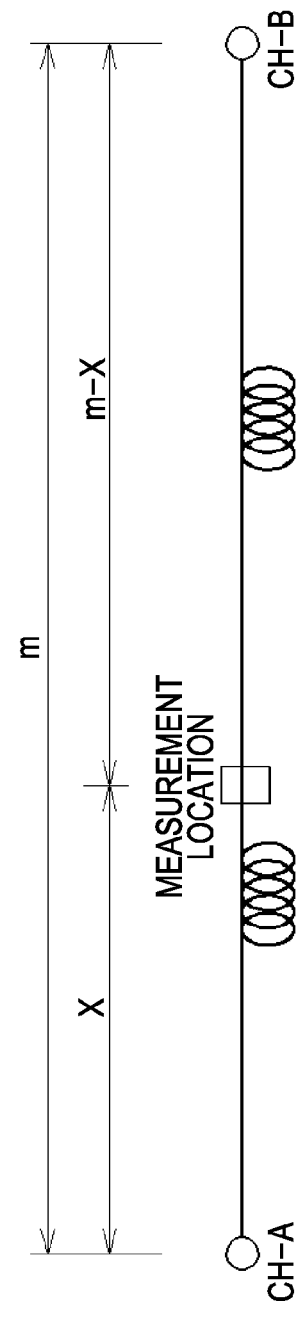
FIG. 7 is a diagram for describing double-ended measurement.

As shown in FIG. 3, the present apparatus may further have a reference thermometer (second reference thermometer) 41 for measuring the temperature of the optical fiber 2 within the constant-temperature unit 30. The reference thermometer 41 measures the temperature of the optical fiber 2 in the constant-temperature unit 30 and outputs the measured temperature to the temperature correction unit 23. The certain loss ratio exists to Ias and Ist in the optical switch 3.

The temperature correction unit 23 uses the temperature measured by the reference thermometer 41 to correct the temperature obtained by the calculation unit 22. As a result, an error of the temperature measurement due to the loss ratio in the optical switch 3 can be corrected. Consequently, accuracy of the temperature measurement can be further improved.

The optical fiber temperature distribution measurement apparatus according to the present disclosure may be any of the following first to third measurement apparatuses. The first measurement apparatus is an optical fiber temperature distribution measurement apparatus for measuring temperature distribution along an optical fiber by using Raman scattered light. The near end and the far end of the optical fiber are connected to an optical switch, and thus a double-ended optical fiber is formed. The first measurement apparatus includes a constant-temperature section and a calculation unit. The constant-temperature section whose temperature is constant is provided on the double-ended optical fiber at the same distance from the optical switch of the double-ended optical fiber. The calculation unit measures temperature distribution along the double-ended optical fiber based on the intensity ratio of anti-Stokes light and Stokes light with regard to the constant-temperature section.

According to the first measurement apparatus, the double-ended optical fiber is provided with the constant-temperature section. As a result, the loss ratio regarding the whole length of the optical fiber can be obtained, and the temperature distribution of the whole length of the double-ended optical fiber can be measured based on the loss ratio regarding the whole length of the optical fiber.

The second measurement apparatus further includes a temperature correction unit in addition to the first measurement apparatus. The temperature correction unit performs correction of the temperature distribution based on the temperature obtained by a reference thermometer that measures the temperature of the constant-temperature section.

The Stokes light intensity and the anti-Stokes light intensity are lost due to the optical switch. Generally, the loss is different between the Stokes light and the anti-Stokes light. That is, the loss ratio corresponds to an error in the temperature measurement. Therefore, by measuring the temperature of the constant-temperature section and performing temperature correction, an error in the measurement of the temperature distribution caused by the loss ratio due to the optical switch can be avoided.

The third measurement apparatus further has the following function in addition to the first measurement apparatus or the second measurement apparatus. That is, the calculation unit obtains a plurality of intensity ratios of the anti-Stokes light to the Stokes light within the constant-temperature section and averages the plurality of intensity ratios to measure the temperature distribution of the double-ended optical fiber.

By obtaining a plurality of samples of the intensity ratio of the anti-Stokes light to the Stokes light within the constant-temperature section and averaging them, accuracy of the measurement of the temperature distribution can be improved.

According to the first to third measurement apparatuses, the double-ended optical fiber is provided with the constant-temperature section and thereby the intensity ratio of the Stokes light to the anti-Stokes light can be calculated accurately even if variation in loss ratio is caused in the double-ended optical fiber. It is therefore possible to accurately measure the temperature distribution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical fiber temperature distribution measurement apparatus, comprising:
   a pulse output unit configured to output a light pulse to a selected one of a first end and a second end of an optical fiber;
   an intensity ratio calculation unit configured to calculate a first intensity ratio and a second intensity ratio, wherein the first intensity ratio is a ratio of Stokes light intensity to anti-Stokes light intensity obtained when the light pulse is output to the first end of the optical fiber, and the second intensity ratio is a ratio of Stokes light intensity to anti-Stokes light intensity obtained when the light pulse is output to the second end of the optical fiber,
   a reference temperature unit including a reference temperature optical fiber and a first reference thermometer configured to measure a temperature with a temperature of the reference temperature optical fiber being a reference temperature;
   a temperature calculation unit configured to calculate a temperature distribution along the optical fiber based on the reference temperature, the first intensity ratio, the second intensity ratio, and a total length loss ratio, wherein the total length loss ratio is a loss ratio of Stokes light intensity to anti-Stokes light intensity with regard to a total length of the optical fiber;
   a constant-temperature unit configured to keep a temperature of a predetermined section close to both ends of the optical fiber constant; and
   a total length loss ratio calculation unit configured to calculate the total length loss ratio based on the first intensity ratio and the second intensity ratio with regard to a location in the predetermined section.

2. The optical fiber temperature distribution measurement apparatus according to claim 1, wherein the total length loss ratio calculation unit is configured to calculate a ratio of the first intensity ratio to the second intensity ratio with regard to a predetermined location in the predetermined section, as the total length loss ratio.

3. The optical fiber temperature distribution measurement apparatus according to claim 1, further comprising:
   a second reference thermometer configured to measure a temperature within the constant-temperature unit; and
   a temperature correction unit configured to correct the temperature distribution along the optical fiber based on the temperature within the constant-temperature unit.

4. The optical fiber temperature distribution measurement apparatus according to claim 1, wherein the total length loss ratio calculation unit calculates respective total length loss ratios with regard to a plurality of locations in the predetermined section and then calculates an average value of the respective total length loss ratios as the total length loss ratio of the optical fiber.

5. The optical fiber temperature distribution measurement apparatus according to claim 1, wherein the total length loss ratio calculation is based on a variable Raman loss ratio across the total length of the optical fiber.

* * * * *